March 10, 1959 P. E. EYSTER 2,876,933
COMBINATION CUTTER AND POURING SPOUT FOR CARTONS
Filed July 25, 1957
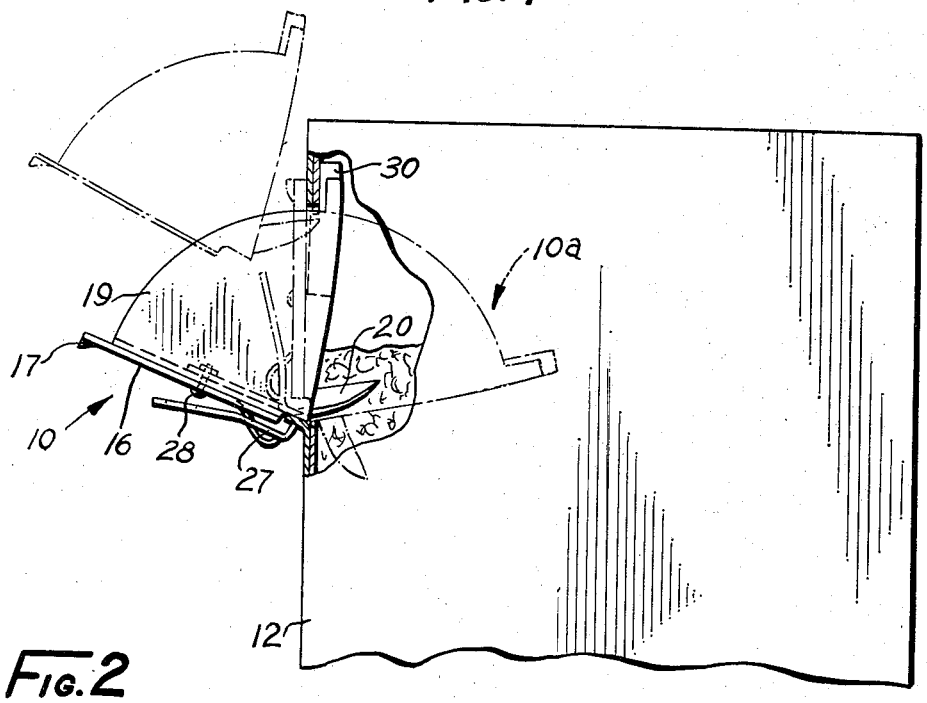
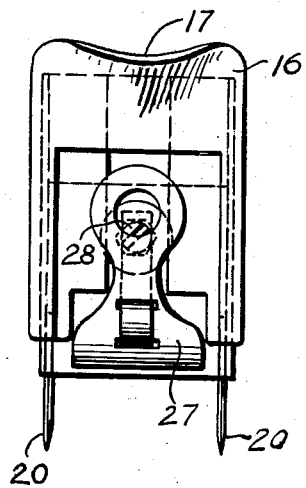
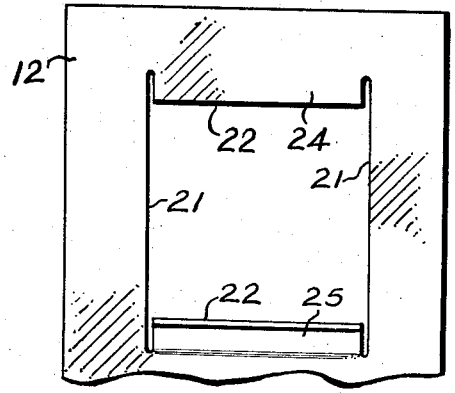
INVENTOR.
PAUL E. EYSTER
Paul E. Eyster

United States Patent Office 2,876,933
Patented Mar. 10, 1959

2,876,933

COMBINATION CUTTER AND POURING SPOUT FOR CARTONS

Paul E. Eyster, Bellville, Ohio

Application July 25, 1957, Serial No. 674,111

3 Claims. (Cl. 222—85)

This invention relates to containers and more particularly to a device for removing the contents therefrom.

It is an object of the present invention to provide a combination cutter and pouring spout for use with pasteboard cartons and boxes, and the like which includes means for cutting a discharge opening, means for attaching the spout within the opening, and hinge means for effecting reciprocating movement of the spout between an open and a closed position.

It is another object of the present invention to provide a combination cutter and pouring spout of the above type which can be used to efficiently dispense various types of fluent material from substantially any type of receptacle and which is adapted to prevent the entry of foreign matter thereto when not in use.

Other objects of the invention are to provide a combination cutter and pouring spout bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a fragmentary side elevational view, with parts broken away, of a combination cutter and pouring spout made in accordance with the present invention in operative use;

Figure 2 is a front elevational view of the device shown in Figure 1; and

Figure 3 is a front elevational view of the side of a box having a discharge opening formed by the device of the present invention.

Referring now more in detail to the drawing, a combination cutter and pouring spout 10 made in accordance with the present invention is shown in operative association with a pasteboard container 12 of the type that is ordinarily used for storing cereal, soapflakes, and the like.

This pouring spout 10 includes a front wall 16 that has a pouring lip 17 at the upper free end thereof. A pair of spaced parallel side walls 19 of sector shape, extend rearwardly from the front wall 16 and define an open back at the opposite ends. A pair of spaced parallel cutting blades 20 extend rearwardly from the inner end of the front wall 16, substantially coplanar with the sides 19. These blades 20 are used to first cut a pair of vertical openings 21 in the side wall of the box 12, following which they are used to cut a pair of horizontal slits 22 so as to permit the removal of a square central section from the box. The vertical slits 21 are made slightly longer at the upper and lower ends than the distance between the blades 20 so that an upper and a lower tab 24, 25 is defined by the extended slit lines. A spring clip 27 secured to the front wall 16 of the spout, such as by a rivet or screw 28, releasably engages with the bottom tab 25 which readily hinges about its connection to the box so that the pouring spout may be selectively rotated between an open position 10 and a closed position 10a. A pair of parallel feet 30 extending outwardly from the side walls 19 in a direction substantially perpendicular to the blades 20 provide limit means for preventing disengagement of the spout from the container.

In use, the cutting blades 20 are first used to provide the vertical and horizontal cutouts as hereinbefore explained. The upwardly extending feet 30 are then first inserted within the provided opening in the container, after which the spring clip 27 is moved into engagement with the bottom tab 25. Thus, in the completely open position 10, as shown in Figure 1, the feet 30 prevent the spout from accidentally withdrawing from the container. In the closed position, the pouring lip 17 overlies the outer side of the side wall thus preventing the accidental movement of the spout into the interior of the box.

While various changes may be made in the detail construction, it shall be understood that such changes shall be within the spirit and scope of the present invention as defined by the appended claims.

What I claim as new and desire to protect by Letters Patent of the United States is:

1. A combination cutter and pouring spout for cartons having a rectangular opening defined on one side by a hinge tab comprising, in combination, a pair of spaced parallel segmental circular side walls having a pair of converging side edges and an outer arcuate edge, a front wall extending between the front side edge of both of said side walls connecting said side walls together, cutting means integral with said spout adjacent to the lower end of said front wall, releasable fastening means carried by said front wall for detachably securing said spout to the hinge tab of the carbon, and limit means for limiting rotation of said spout about an axis extending perpendicular to said side walls, said cutting means comprising a pair of spaced parallel blades extending outwardly and rearwardly from said side walls and lying substantially coplanar therewith, said fastening means comprising a spring clip secured to the lower end of said front wall.

2. The combination according to claim 1, wherein said limit means comprises stops extending outwardly from said side walls in a direction substantially perpendicular to said blades.

3. The combination according to claim 2, wherein the end of said front wall opposite said spring clip defines a pouring lip extending substantially beyond adjacent edges of said side walls.

References Cited in the file of this patent

UNITED STATES PATENTS

| | | |
|---|---|---|
| 2,318,899 | Stilwell | May 11, 1943 |
| 2,333,781 | Halstead | Nov. 9, 1943 |